United States Patent [19]
Itoh

[11] Patent Number: 4,474,436
[45] Date of Patent: Oct. 2, 1984

[54] FINITE DISTANCE ZOOM LENS SYSTEM
[75] Inventor: Takayuki Itoh, Tokyo, Japan
[73] Assignee: Asahi Kogakukogyo Kabushiki Kaisha, Tokyo, Japan
[21] Appl. No.: 313,449
[22] Filed: Oct. 21, 1981
[30] Foreign Application Priority Data Oct. 24, 1980 [JP] Japan ................. 55-149129

[51] Int. Cl.³ .................... G02B 9/64; G02B 15/16
[52] U.S. Cl. ......................................... 350/426
[58] Field of Search ................................. 350/426
[56] References Cited
U.S. PATENT DOCUMENTS 4,157,212 6/1979 Ogawa ..................... 350/426

FOREIGN PATENT DOCUMENTS 2033605 5/1980 United Kingdom .......... 350/426

Primary Examiner—John K. Corbin
Assistant Examiner—Rebecca D. Gass
Attorney, Agent, or Firm—Sughrue, Mion, Zinn, Macpeak & Seas

[57] ABSTRACT

A finite distance zoom lens system including a first lens group having a negative focal length and a second lens group having a positive focal length. The two lens groups are mechanically movable to thereby vary the focal length while maintaining constant the distance between the object surface and the image surface. The zoom lens system has a magnification of about 1/10 to 1/5 times.

9 Claims, 9 Drawing Figures

1

FINITE DISTANCE ZOOM LENS SYSTEM

BACKGROUND OF THE INVENTION

The present invention relates to a zoom lens system for finite distance photography, having a magnification of about 1/10 to 1/5 times. It relates, more particularly, to a zoom lens system in which the distance between the object surface and the image surface is maintained constant and finite, while enabling the power variation.

Conventionally well-known zoom lenses are classified into zoom lenses for still cameras having a magnification range from ∞ (magnification of 0) to about 1/10, and copying zoom lenses having a magnification range near the equal or unity magnification. The zoom lens system according to the present invention has an intermediate magnification range between the former and latter cases.

Comparing the zoom lens according to the present invention with the above described two known zoom lenses, the zoom lens of the present invention is similar to the still camera zoom lens in respect of the manner of moving the lens groups. Namely, the overall lens system is not moved as in the copying zoom lens but the respective lens groups are moved within the lens barrel. However, due to the fact that the distance between the object and the image is fixed, the present zoom system is similar to the copying zoom lens. Also, with respect to a lens performance, due to the fact that distortion is extremely small and a sufficient amount of marginal light is required, the zoom lens according to the present invention is similar to the copying zoom lens.

However, there is a significant difference between the present device and the above described lenses in that extremely high contrast and resolving power are required at marginal sections.

Thus, a comparison of the present zoom lens with zoom lenses which have different uses or object has been made. There are well known zoom systems having substantially the same magnification range as the present invention. Namely, there have been provided zoom systems in which a fixed focus lens is used, and in which a plurality of fixed focus lenses are rotated. The latter case is the so called "turret system". The former case has a disadvantage in that the distance between the object and image cannot be maintained constant and in addition, the amount of variation of the distance between the object and image is very large. The latter case has a disadvantage in that the magnification operation is not continuous but intermittent, and it is very difficult to adjust the system due to the manufacturing error of each lens element, i.e., to maintain the distance from the object to the image constant, and to adjust the system in order to obtain a predetermined magnification.

SUMMARY OF THE INVENTION

An object of the present invention is to eliminate the above noted defects by providing a novel zoom lens system.

Also, the zoom lens of finite distance to which the present invention is directed is particularly usable in a facsimile. In a zoom lens for a facsimile, by disposing some sensors on the image surface, it is possible to telegraphically transfer information contained on an original without moving the variously sized original papers together with the sensors. If the image and the object are inverted, it is possible to use the lens system as an enlargement zoom lens enabling the magnification to be continuously changed.

DESCRIPTION OF THE PREFERRED EMBODIMENTS

Figure 1:
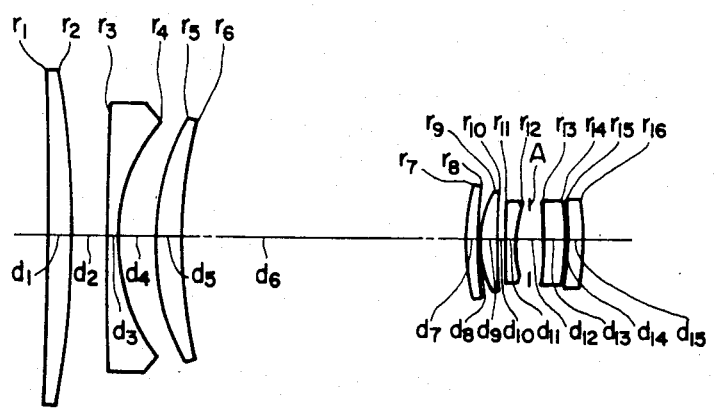
FIGS. 1, 3 and 5 show lens constructions at the low magnification side corresponding to Examples 1, 2 and 3, respectively.
Figure 2A:
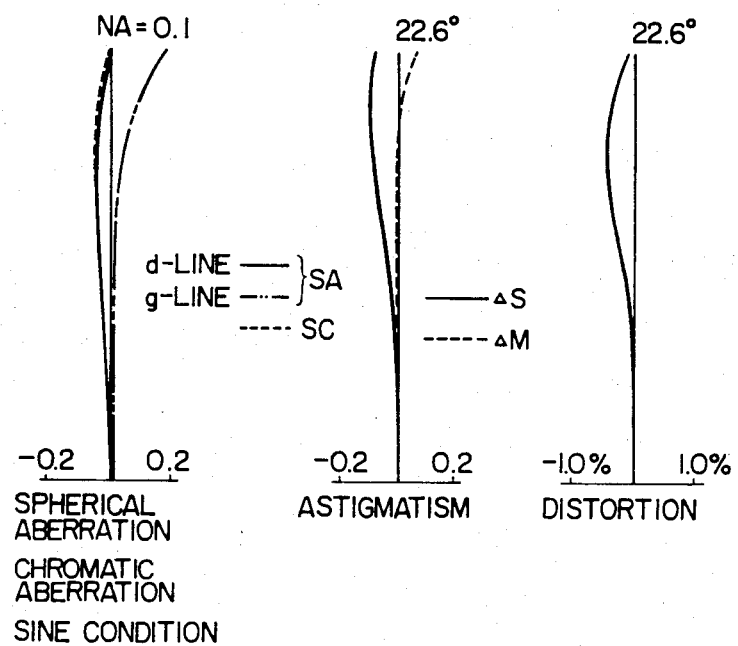
FIGS. 2(a) and (b), FIGS. 4(a) and (b) and FIGS. 6(a) and (b) are, respectively, aberration graphs, (a) and (b) respectively designating low magnification and high magnification, wherein $r_i$ is the radius of curvature of each lens surface, $d_i$ is the lens thickness or the air gap and A is the stop diaphragm.
Figure 2B:
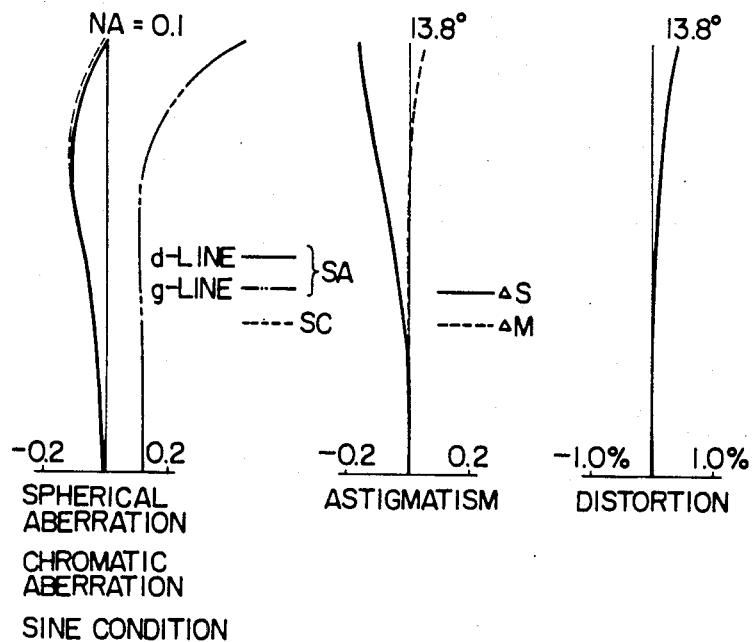
Figure 3:
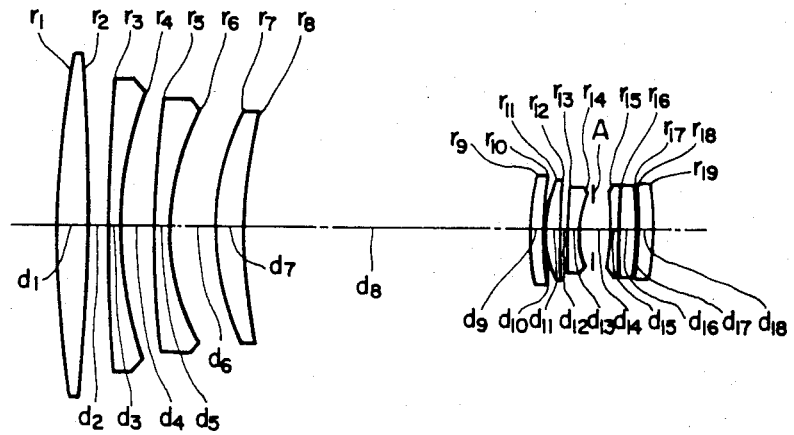
Figure 4A:
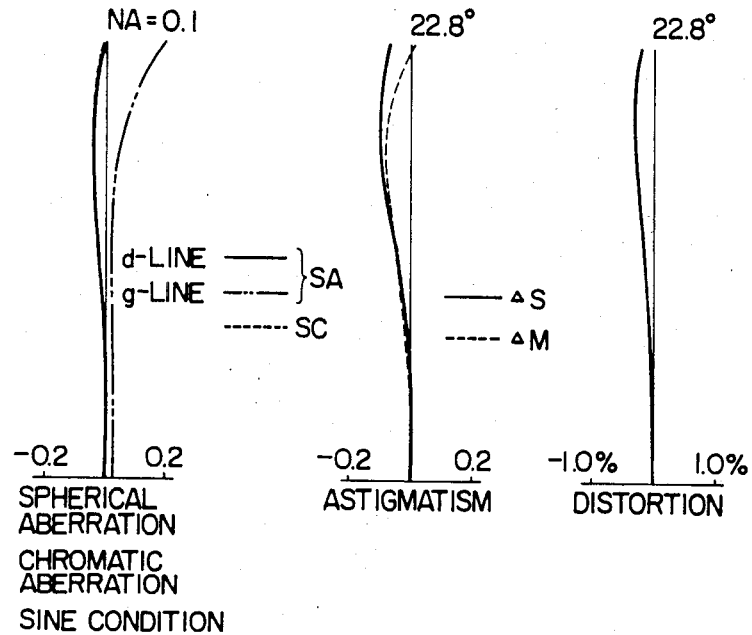
Figure 4B:
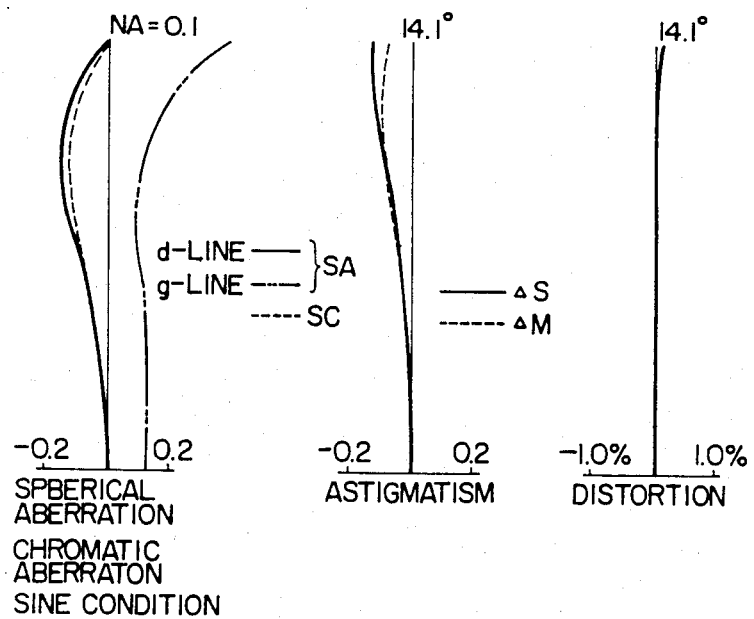
Figure 5:
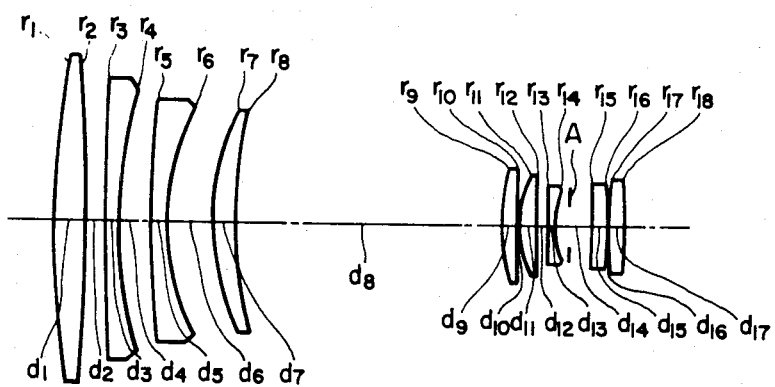
Figure 6A:
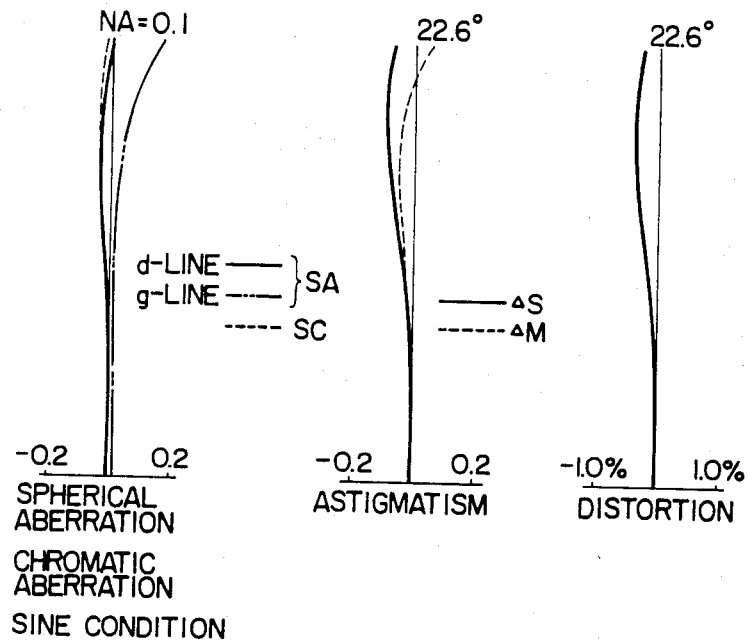
Figure 6B:
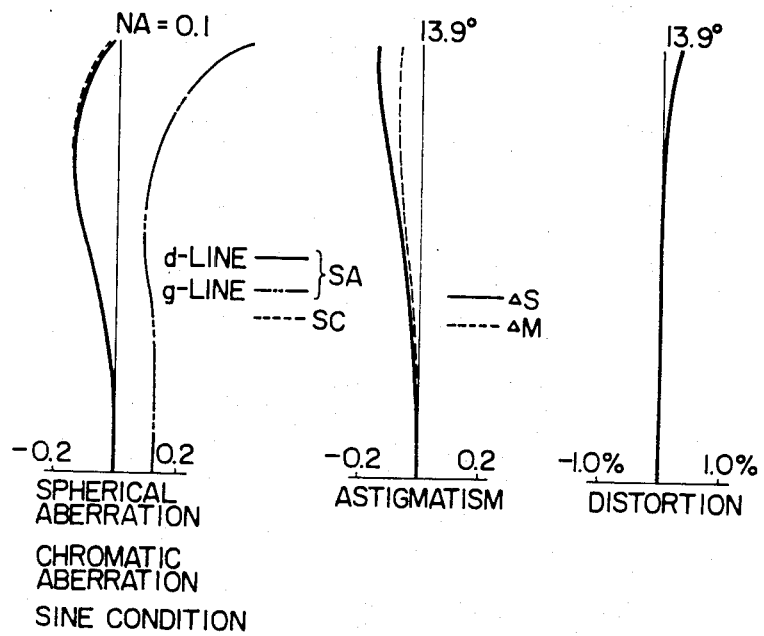

The present invention will now be described in detail. A finite distance zoom lens system in accordance with the present invention is composed, in order from the object side, of a first lens group having a negative focal length and a second lens group having a positive focal length. The first and second lens groups are mechanically moved to thereby vary the focal length while maintaining constant the distance between the object surface and the image surface. According to the present invention there is provided a finite distance zoom lens system in which the first lens group mainly serves to maintain constant the distance between the object surface and the image surface and the second lens group mainly serves to vary the magnification. The first lens group consists, in order from the object side, of a first positive lens component, a first negative lens component and a second positive lens component. The first positive lens component disposed on the object side includes a positive lens and has a surface on the image side, which is convex to the image side. The first negative lens component includes one or two negative lenses. The second positive lens component disposed on the image side is composed of a positive meniscus lens having a convex surface on the object side. The second lens group also consists of a third positive lens comonent, a second negative lens component and a fourth positive lens component. The third positive lens component disposed on the object side is composed of two positive lenses, each convex surface of which is directed to the object. The second negative lens component includes a negative lens having on the image side a surface concave to the image side. The fourth positive lens component disposed on the image side includes two positive lenses. The finite distance lens satisfies the following condition;

$$Mmax/Mmin < 2.0 \tag{1}$$

$$-1.0 < fmax/f_I < -0.2 \tag{2}$$

$$0.5 < \Delta l_{I,II}/fmax < 1.5 \tag{3}$$

$$0 < fmax/f_2 < 0.5 \tag{4}$$

$$1.65 < (n_{II1} + n_{II2})/2 \tag{5}$$

where,

Mmax/Mmin is the variable power ratio;
Mmax is the magnification at the high magnification side in the variable magnification range;
Mmin is the magnification at the low magnification side in the variable magnification range;

$f_{max}$ is the overall focal length at the high magnification side;

$f_I$ is the focal length of the first lens group;

$\Delta l_{I,II}$ is the amount of variation between the distance between the first and second lens groups;

$f_2$ is the focal length of the image side surface of the first positive lens of the first lens component of the first lens group $(f_2 = r_2/1-n_1)$;

$r_2$ is the radius of curvature of the image side surface of the first lens of the first positive lens component of the first lens group;

$n_1$ is the refractive index, at the d-line, of the first positive lens of the first lens component of the first lens group;

$n_{III}$ is the refractive index, at the d-line, of the first positive lens of the third lens component of the second lens group; and $n_{II2}$ is the refractive index, at the d-line, of the image side lens of the fourth positive lens component of the second lens group.

In the lens system according to the present invention, the second lens group is formed as a modified Gauss type. However, the positive lens, on the object side of the positive lens unit of the second lens group may be formed as a cemented lens so that the aberration compensation can be well achieved. Therefore, in order to obtain a lens system having a great numerical aperture, it is preferable to use a cemented lens.

Also, other than the modified Gauss type, it is possible to use a split dagor type often used for the fixed focus lens system or a modified split dagor type as the second lens group.

The specific conditions will now be described.

Condition (1) relates to the variable power ratio of the present invention. When the upper limit is exceeded, the overall physical size of the lens system is enlarged and in the two-lens group type zoom system it is difficult to compensate for the distortion. In this case, it is impossible to ensure a sufficiently high resolving power at the margine.

Conditions (2) and (3) concern the power distribution of the lens system. When the upper limit of condition (2) is exceeded, the movement distance of the first lens group is increased. Inversely, when the lower limit is exceeded, the negative power of the first lens group is excessive, and it is difficult to correct, particularly, the distortion. In addition, since the movement of the first lens group has a point of inflection, it is also difficult to ensure mechanical accuracy.

When the upper limit of condition (3) is exceeded, it is impossible to miniaturize the lens system. Inversely, when the lower limit is exceeded, in order to obtain a predetermined variable power ratio, the power of each lens group must be increased. This is not desirable for aberration compensation.

Condition (4) is important for the correction of distortion. Condition (4) relates to the lens surface power of the image side surface of the first positive lens of the first lens group. When the upper limit is exceeded, the correction of the distortion is excessive, and the negative distortion is a maximum in the intermediate view angle at the low magnification side. As a result, the distortion is small at the margin, that is, the so-called returning amount of the distortion is increased. This phenomenon is not desirable. When the lower limit is exceeded, it is difficult to correct the positive distortion at the high magnification side.

Condition (5) relates to a curvature of field. When the lower limit is exceeded, the Petzval's sum is increased, the view field is negative, and the difference in astigmatism between the meridional direction and the sagittal direction (astigmatic difference) is increased. As a result, high resolving power cannot be obtained.

Examples 1 to 3 according to the present invention will now be described, in which r is the radius of curvature, d is the lens thickness or the air gap, N is the refractive index at d-line, $\nu$ is the Abbe number, f is the overall focal length, $F_\infty$ is the F-number with respect to the $\infty$ object, M is the magnification, $\omega$ is half is view angle, L is the distance between the object and the image, and NA is the numerical aperture and is represented by the following equation by using the pupil magnification $\psi$;

$$NA = \frac{1}{2F_\infty \left(1 + \frac{|M|}{\psi}\right)}$$

| Surface No. | | r | d | N | $\nu$ |
|---|---|---|---|---|---|
| Example 1 | | | | | |
| $F_\infty = 4.8 \sim 4.5$  $f = 32.1 \sim 50.2$ | | | | | |
| $\omega = 22.6° \sim 13.8°$  NA = 0.1  L = 436.80 | | | | | |
| $M = -0.096 \sim -0.158$  $\psi = 1.32 \sim 0.98$ | | | | | |
| | 1 | −1322.943 | 4.50 | 1.72916 | 54.7 |
| | 2 | −140.878 | 5.51 | | |
| First | 3 | 1475.589 | 2.00 | 1.83400 | 37.2 |
| Lens | 4 | 29.209 | 5.80 | | |
| Group | 5 | 33.591 | 4.50 | 1.80518 | 25.4 |
| | 6 | 66.896 | 50.33 ~ 3.00 | | |
| | 7 | 25.748 | 2.70 | 1.80610 | 40.9 |
| | 8 | 84.754 | 0.10 | | |
| | 9 | 16.542 | 2.70 | 1.77250 | 49.6 |
| | 10 | 49.702 | 1.68 | | |
| Second | 11 | 386.228 | 1.33 | 1.80518 | 25.4 |
| Lens | 12 | 13.520 | 4.68 | | |
| Group | 13 | −79.226 | 3.83 | 1.77250 | 49.6 |
| | 14 | −34.093 | 0.2 | | |
| | 15 | −372.101 | 2.50 | 1.80610 | 40.9 |
| | 16 | −76.432 | | | |
| Mmax/Mmin = 1.632 | | | | | |
| $f_{max}/f_I = -0.465$ | | | | | |
| $\Delta l_{I,II}/f_{max} = 0.943$ | | | | | |
| $f_{max}/f_2 = 0.26$ | | | | | |
| $(n_{III} + n_{II2})/2 = 1.789$ | | | | | |
| Example 2 | | | | | |
| $F_\infty = 4.8 \sim 4.5$  $f = 31.8 \sim 50.0$ | | | | | |
| $\omega = 22.8° \sim 14.1°$  NA = 0.1 | | | | | |
| $M = -0.096 \sim -0.158$  $\psi = 1.46 \sim 1.08$ | | | | | |
| L = 436.76 | | | | | |
| | 1 | 138.453 | 4.70 | 1.72916 | 54.7 |
| | 2 | −586.153 | 3.50 | | |
| | 3 | 231.351 | 2.00 | 1.80610 | 40.9 |
| First | 4 | 57.901 | 5.55 | | |
| Lens | 5 | 125.015 | 2.00 | 1.80610 | 40.9 |
| Group | 6 | 32.615 | 8.29 | | |
| | 7 | 37.023 | 4.50 | 1.80518 | 25.4 |
| | 8 | 65.481 | 47.40 ~ 2.50 | | |
| | 9 | 23.846 | 2.70 | 1.80610 | 40.9 |
| | 10 | 69.437 | 0.10 | | |
| | 11 | 17.262 | 2.70 | 1.78590 | 44.2 |
| | 12 | 57.940 | 1.24 | | |
| Second | 13 | 783.996 | 1.33 | 1.75520 | 27.5 |
| Lens | 14 | 13.093 | 5.85 | | |
| Group | 15 | −81.149 | 1.20 | 1.74077 | 27.8 |
| | 16 | 124.360 | 3.00 | 1.72916 | 54.7 |
| | 17 | −41.700 | 0.20 | | |
| | 18 | −159.466 | 2.50 | 1.80610 | 40.9 |
| | 19 | −47.810 | | | |
| Mmax/Mmin = 1.632 | | | | | |
| $f_{max}/f_I = -0.508$ | | | | | |
| $\Delta l_{I,II}/f_{max} = 0.898$ | | | | | |
| $f_{max}/f_2 = 0.062$ | | | | | |
| $(n_{III} + n_{II2})/2 = 1.796$ | | | | | |
| Example 3 | | | | | |

-continued $$NA = \cfrac{1}{2F_\infty \left(1 + \cfrac{|M|}{\psi}\right)}$$

$F_\infty = 4.8 \sim 4.5 \quad f = 32.2 \sim 50.2$
$\omega = 22.6° \sim 13.9° \quad NA = 0.1$
$M = -0.096 \sim -0.158 \quad \psi = 1.33 \sim 1.00$
$L = 436.80$

| | Surface No. | r | d | N | ν |
|---|---|---|---|---|---|
| First Lens Group | 1 | 129.940 | 5.10 | 1.69680 | 55.5 |
| | 2 | −389.343 | 3.40 | | |
| | 3 | 420.356 | 2.10 | 1.80610 | 40.9 |
| | 4 | 65.941 | 5.50 | | |
| | 5 | 171.109 | 2.00 | 1.80610 | 40.9 |
| | 6 | 32.566 | 8.10 | | |
| | 7 | 38.216 | 4.00 | 1.80518 | 25.4 |
| | 8 | 72.563 | 43.83 ∼ 2.50 | | |
| Second Lens Group | 9 | 22.550 | 2.80 | 1.80610 | 40.9 |
| | 10 | 103.797 | 0.10 | | |
| | 11 | 16.987 | 2.70 | 1.72916 | 54.7 |
| | 12 | 38.277 | 1.97 | | |
| | 13 | 255.112 | 1.25 | 1.80518 | 25.4 |
| | 14 | 13.169 | 6.15 | | |
| | 15 | −100.371 | 2.80 | 1.72916 | 54.7 |
| | 16 | −41.793 | 0.20 | | |
| | 17 | 256.437 | 2.50 | 1.73400 | 51.5 |
| | 18 | −81.925 | | | |

$Mmax/Mmin = 1.632$
$fmax/f_I = -0.526$
$\Delta l_{I,II}/fmax = 0.823$
$fmax/f_2 = 0.090$
$(n_{III} + n_{II2})/2 = 1.768$

What is claimed is:

1. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including a single negative lens, said second positive lens component including a positive meniscus lens having a convex surface on the object side, said second lens group consisting of a third positive lens component, a second negative lens component and a fourth positive lens component, said third positive lens component including two positive lenses, each convex surface of which is directed to the object, said second negative lens component including a negative lens having on the image side a surface concave to the image side, said fourth positive lens component including two positive lenses, said finite distance zoom lens system satisfying the following conditions:

$F_\infty = 4.8 \sim 4.5 \quad f = 32.1 \sim 50.2$
$\omega = 22.6° \sim 13.8° \quad NA = 0.1 \quad L = 436.80$
$M = -0.096 \sim -0.158 \quad \psi = 1.32 \sim 0.98$

| | Surface No. | r | d | N | ν |
|---|---|---|---|---|---|
| First Lens Group | 1 | −1322.943 | 4.50 | 1.72916 | 54.7 |
| | 2 | −140.878 | 5.51 | | |
| | 3 | 1475.589 | 2.00 | 1.83400 | 37.2 |
| | 4 | 29.209 | 5.80 | | |
| | 5 | 33.591 | 4.50 | 1.80518 | 25.4 |
| | 6 | 66.896 | 50.33∼3.00 | | |
| Second Lens Group | 7 | 25.748 | 2.70 | 1.80610 | 40.9 |
| | 8 | 84.754 | 0.10 | | |
| | 9 | 16.542 | 2.70 | 1.77250 | 49.6 |
| | 10 | 49.702 | 1.68 | | |
| | 11 | 386.228 | 1.33 | 1.80518 | 25.4 |
| | 12 | 13.520 | 4.68 | | |
| | 13 | −79.226 | 3.83 | 1.77250 | 49.6 |
| | 14 | −34.093 | 0.2 | | |
| | 15 | −372.101 | 2.50 | 1.80610 | 40.9 |
| | 16 | −76.432 | | | | where,

Mmax/Mmin is the variable power ratio;

Mmax is the magnification at the high magnification side in the variable magnification range;

Mmin is the magnification at the low magnification side in the variable magnification range;

fmax is the overall focal length at the high magnification side;

$f_I$ is the focal length of the first lens group;

$\Delta l_{I,II}$ is the amount of variation between the distance between the first and second lens groups;

$f_2$ is the focal length of the image side surface of the first positive lens of the first lens component of the first lens group $(f_2 = r_2/1 - n_1)$;

$r_2$ is the radius of curvature of the image side surface of the first lens of the first positive lens component of the first lens group;

$n_1$ is the refractive index, at the d-line, of the first positive lens of the first lens component of the first lens group;

$n_{III}$ is the refractive index, at the d-line, of the first positive lens of the third lens component of the second lens group; and $n_{II2}$ is the refractive index, at the d-line, of the image side lens of the fourth positive component of the second lens group $Mmax/Mmin = 1.621$ $fmax/f_I = -0.465$ $\Delta l_{I,II}/fmax = 0.943$ $fmax/f_2 = 0.26$ $(n_{III} + n_{II2})/2 = 1.789$ where, r is the radius of curvature d is the lens thickness or the air gap, N is the refractive index at d-line ν is the Abbe number f is the overall focal length $F_\infty$ is the F-number with respect to the infinite object M is the magnification ω is half the view angle L is the distance between the object and the image NA is the numerical aperture and ψ is the pupil magnification.

2. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, siad first negative lens component including a positive meniscus lens having a convex surface on the object side, said second lens group consisting of a third positive lens component, a second negative lens component and a fourth positive lens component, said third positive lens component including two positive lenses, each convex surface of which is directed to the object, said second negative lens component including a negative lens having on the image side a surface concave to the image side, said fourth positive lens component including two positive lenses, and wherein the positive lens, disposed on the object side, of said fourth positive lens component consists of a cemented positive lens composed of a negative lens and a positive lens, said finite distance zoom lens system satisfying the following conditions:

$F_\infty = 4.8 \sim 4.5 \quad f = 31.8 \sim 50.0$
$\omega = 22.8° \sim 14.1° \quad NA = 0.1$
$M = -0.096 \sim -0.158 \quad \psi = 1.46 \sim 1.08$
$L = 436.76$

| Surface No. | r | d | N | ν |
|---|---|---|---|---|
| 1 | 138.453 | 4.70 | 1.72916 | 54.7 |
| 2 | −586.153 | 3.50 | | |
| 3 | 231.351 | 2.00 | 1.80610 | 40.9 |
| First 4 | 57.901 | 5.55 | | |
| Lens 5 | 125.015 | 2.00 | 1.80610 | 40.9 |
| Group 6 | 32.615 | 8.29 | | |
| 7 | 37.023 | 4.50 | 1.80518 | 25.4 |
| 8 | 65.481 | 47.40 ~ 2.50 | | |
| 9 | 23.846 | 2.70 | 1.80610 | 40.9 |
| 10 | 69.437 | 0.10 | | |
| 11 | 17.262 | 2.70 | 1.78590 | 44.2 |
| 12 | 57.940 | 1.24 | | |
| Second 13 | 783.996 | 1.33 | 1.75520 | 27.5 |
| Lens 14 | 13.093 | 5.85 | | |
| Group 15 | −81.149 | 1.20 | 1.74077 | 27.8 |
| 16 | 124.360 | 3.00 | 1.72916 | 54.7 |
| 17 | −41.700 | 0.20 | | |
| 18 | −159.466 | 2.50 | 1.80610 | 40.9 |
| 19 | −47.810 | | | |

Mmax/Mmin = 1.632
fmax/$f_I$ = 0.508
$\Delta l_{I,II}$/fmax = 0.898
fmax/$f_2$ = 0.062
$(n_{III} + n_{II_2})/2 = 1.796$ where:
r is the radius of curvature
d is the lens thickness or the air gap, N is the refractive index at d-line
ν is the Abbe number
f is the overall focal length
$F_{2\beta}$ is the F-number with respect to the infinite object
M is the magnification
ω is half the view angle
L is the distance between the object and the image NA is the numerical aperture and ψ is the pupil magnification,
Mmax/Mmin is the variable power ratio;
Mmax is the magnification at the high magnification side in the variable magnification range;
Mmin is the magnification at the low magnification side in the variable magnification range;
fmax is the overall focal length at the high magnification side;
$f_I$ is the focal length of the first lens group;
$\Delta l_{I,II}$ is the amount of variation between the distance between the first and second lens groups;
$f_2$ is the focal length of the image side surface of the first positive lens of the first lens component of the first lens group $(f_2 = r_2/1 - n_1)$;
$r_2$ is the radius of curvature of the image side surface of the first lens of the first positive lens component of the first lens group;
$n_1$ is the refractive index, at the d-line, of the first positive lens of the first lens component of the first lens group;
$n_{III}$ is the refractive index, at the d-line, of the first positive lens of the third lens component of the second lens group; and
$n_{II_2}$ is the refractive index, at the d-line, of the image side lens of the fourth positive lens component of the second lens group.

3. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain contant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including two negative lenses, said second positive lens component including a positive meniscus lens having a convex surface on the object side, said second lens group consisting of a third positive lens component, a second negative lens component and a fourth positive lens component, said third positive component including two positive lenses, each convex surface of which is directed to the object, said second negative lens component including a negative lens having on the image side a surface concave to the image side, said fourth positive lens component on the image side two positive lenses, said finite distance zoom lens system satisfying the following conditions:

$F_\infty = 4.8 \sim 4.5 \quad f = 32.2 \sim 50.2$
$\omega = 22.6° \sim 13.9° \quad NA = 0.1$
$M = -0.096 \sim -0.158 \quad \psi = 1.33 \sim 1.00$
$L = 436.80$

| Surface No. | r | d | N | ν |
|---|---|---|---|---|
| 1 | 129.940 | 5.10 | 1.69680 | 55.5 |
| 2 | −389.343 | 3.40 | | |
| 3 | 420.356 | 2.10 | 1.80610 | 40.9 |
| First 4 | 65.941 | 5.50 | | |
| Lens 5 | 171.109 | 2.00 | 1.80610 | 40.9 |
| Group 6 | 32.566 | 8.10 | | |
| 7 | 38.216 | 4.00 | 1.80518 | 25.4 |
| 8 | 72.563 | 43.83 ~ 2.50 | | |

-continued

| | | | | | |
|---|---|---|---|---|---|
| | 9 | 22.550 | 2.80 | 1.80610 | 40.9 |
| | 10 | 103.797 | 0.10 | | |
| | 11 | 16.987 | 2.70 | 1.72916 | 54.7 |
| | 12 | 38.277 | 1.97 | | |
| Second Lens Group | 13 | 255.112 | 1.25 | 1.80518 | 25.4 |
| | 14 | -13.169 | 6.15 | | |
| | 15 | -100.371 | 2.80 | 1.72916 | 54.7 |
| | 16 | -41.793 | 0.20 | | |
| | 17 | 256.437 | 2.50 | 1.73400 | 51.5 |
| | 18 | -81.925 | | | | where:
r is the radius of curvature
d is the lens thickness or the air gap N is the refractive index at d-line
ν is the Abbe number
f is the overall focal length
$F\infty$ is the F-number with respect to the infinite object
M is the magnification
ω is half the view angle
L is the distance between the object and the image
NA is the numerical aperture and ψ is the pupil magnification.

4. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including a single negative lens, said second positive lens component including a positive meniscus lens having a convex surface on the object side, said second lens group consisting of a third positive lens component, a second negative lens component and a fourth positive lens component, said third positive lens component including two positive lenses, each convex surface of which is directed to the object, said second negative lens component including a negative lens having on the image side a surface concave to the image side, said fourth positive lens component including two positive lenses, said finite distance zoom lens system satisfying the following conditions;

$$-0.8 < f_{max}/f_I < -0.2 \tag{1}$$

$$0.7 < \Delta l_{I,II}/f_{max} < 1.2 \tag{2}$$

$$0 < f_{max}/f_2 < 0.3 \tag{3}$$

$$1.7 < (n_{III} + n_{II2})/2 \tag{4}$$

where,
$f_{max}$ is the overall focal length at the high magnification side;
$f_I$ is the focal length of the first lens group;
$\Delta l_{I,II}$ is the amount of variation between the distance between the first and second lens groups;
$f_2$ is the focal length of the image side surface of the first positive lens of the first lens component of the first lens group ($f_2 = r_2/1 - n_1$);
$r_2$ is the radius of curvature of the image side surface of the first lens of the first positive lens component of the first lens group;
$n_1$ is the refractive index, at the d-line, of the first positive lens of the first lens component of the first lens group;
$n_{III}$ is the refractive index, at the d-line, of the first positive lens of the third lens component of the second lens group; and
$n_{II2}$ is the refractive index, at the d-line, of the image side lens of the fourth positive lens component of the second lens group.

5. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including two negative lenses, said second positive lens component including a positive meniscus lens having a convex surface on the object side, said second lens group consisting of a third positive lens component, a second negative lens component and a fourth positive lens component, said third positive lens component including two positive lenses, each convex surface of which is directed to the object, said second negative lens component including a negative lens having on the image side a surface concave to the image side, said fourth positive lens component including two positive lenses, and wherein the positive lens, disposed on the object side, of said fourth positive lens component consists of a cemented positive lens composed of a negative lens and a positive lens, said finite distance zoom lens system satisfying the following conditions:

$$-0.8 < f_{max}/f_I < -0.2 \tag{1}$$

$$0.7 < \Delta l_{I,II}/f_{max} < 1.2 \tag{2}$$

$$0 < f_{max}/f_2 < 0.3 \tag{3}$$

$$1.7 < (n_{III} + n_{II2})/2 \tag{4}$$

where,
$f_{max}$ is the overall focal length at the high magnification side;
$f_I$ is the focal length of the first lens group;
$\Delta l_{I,II}$ is the amount of variation between the distance between the first and second lens groups;

$f_2$ is the focal length of the image side surface of the first positive lens of the first lens component of the first lens group ($f_2 = r_2/1-n_1$);

$r_2$ is the radius of curvature of the image side surface of the first lens of the first positive lens component of the first lens group;

$n_1$ is the refractive index, at the d-line, of the first positive lens of the first lens component of the first lens group;

$n_{III}$ is the refractive index, at the d-line, of the first positive lens of the third lens component of the second lens group; and $n_{II2}$ is the refractive index, at the d-line, of the image side lens of the fourth positive lens component of the second lens group.

6. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including two negative lenses, said second positive lens component including a positive meniscus lens having a convex surface on the object side, said second lens group consisting of a third positive lens component, a second negative lens component and a forth positive lens component, said third positive component including two positive lenses, each convex surface of which is directed to the object, said second negative lens component including a negative lens having on the image side a surface concave to the image side, said fourth positive lens component on the image side two positive lenses, said finite distance zoom lens system satisfying the following conditions:

$$-0.8 < f_{max}/f_I < -0.2 \quad (1)$$

$$0.7 < \Delta l_{I,II}/f_{max} < 1.2 \quad (2)$$

$$0 < f_{max}/f_2 < 0.3 \quad (3)$$

$$1.7 < (n_{III} + n_{II2})/2 \quad (4)$$

where, $f_{max}$ is the overall focal length at the high magnification side;

$f_I$ is the focal length of the first lens group;

$\Delta l_{I,II}$ is the amount of variation between the distance between the first and second lens groups;

$f_2$ is the focal length of the image side surface of the first positive lens of the first lens component of the first lens group ($f_2 = r_2/1-n_1$);

$r_2$ is the radius of curvature of the image side surface of the first lens of the first positive lens component of the first lens group;

$n_1$ is the refractive index, at the d-line, of the first positive lens of the first lens component of the first lens group;

$n_{III}$ is the refractive index, at the d-line, of the first positive lens of the third lens component of the second lens group; and $n_{II2}$ is the refractive index, at the d-line, of the image side lens of the fourth positive lens component of the second lens group.

7. In a finite distance zoom lens system composed, in order from the object side, of a first lens group having a negative focal length and a second lens group having a positive focal length, said first and second lens groups being mechanically moved to thereby vary the focal length while maintaining constant the distance between the object furface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including a single negative lens, said second positive lens component including a positive meniscus lens having a convex surface on the object side, said second lens group consisting of a third positive lens component, a second negative lens component and a fourth positive lens component, said third positive lens component including two positive lenses, each convex surface of which is directed to the object, said second negative lens component including a negative lens having on the image side a surface concave to the image side, said fourth positive lens component including two positive lenses, said finite distance zoom lens system satisfying the following conditions;

$$-0.53 < f_{max}/f_I < -0.46 \quad (1)$$

$$0.82 < \Delta l_{I,II}/f_{max} < 0.95 \quad (2)$$

$$0.06 < f_{max}/f_2 < 0.26 \quad (3)$$

$$1.76 < (n_{III} + n_{II2})/2 \quad (4)$$

where, $f_{max}$ is the overall focal length at the high magnification side;

$f_I$ is the focal length of the first lens group;

$\Delta l_{I,II}$ is the amount of variation between the distance between the first and second lens groups;

$f_2$ is the focal length of the image side surface of the first positive lens of the first lens component of the first lens group ($f_2 = r_2/1-n_1$);

$r_2$ is the radius of curvature of the image side surface of the first lens of the first positive lens component of the first lens group;

$n_1$ is the refractive index, at the d-line, of the first positive lens of the first lens component of the first lens group;

$n_{III}$ is the refractive index, at the d-line, of the first positive lens of the third lens component of the second lens group; and $n_{II2}$ is the refractive index, at the d-line, of the image side lens of the fourth positive lens component of the second lens group.

8. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including two negative lenses, said second positive lens component including a positive meniscus lens having a convex surface on the object side, said second lens group consisting of a third positive lens component, a second negative lens component and a fourth positive lens component, said third positive lens component including two positive lenses, each convex surface of which is directed to the object, said second negative lens component including a negative lens having on the image side a surface concave to the image side, said fourth positive lens component including two positive lenses, and wherein the positive lens, disposed on the object side, of said fourth positive lens component consists of a cemented positive lens composed of a negative lens and a positive lens, said finite distance zoom lens system satisfying the following conditions:

$-0.53 < f_{max}/f_I < -0.46$ (1)

$0.82 < \Delta l_{I,II}/f_{max} < 0.95$ (2)

$0.06 < f_{max}/f_2 < 0.12$ (3)

$1.76 < (n_{II1} + n_{II2})/2$ (4)

where
$f_{max}$ is the overall focal length at the high magnification side;
$f_I$ is the focal length of the first lens group;
$\Delta l_{I,II}$ is the amount of variation between the distance between the first and second lens groups;
$f_2$ is the focal length of the image side surface of the first positive lens of the first lens component of the first lens group $(f_2 = r_2/1 - n_1)$;
$r_2$ is the radius of curvature of the image side surface of the first lens of the first positive lens component of the first lens group;
$n_1$ is the refractive index, at the d-line, of the first positive lens of the first lens component of the first lens group;
$n_{II1}$ is the refractive index, at the d-line, of the first positive lens of the third lens component of the second lens group; and $n_{II2}$ is the refractive index, at the d-line, of the image side lens of the fourth positive lens component of the second lens group.

9. In a finite distance zoom lens system composed, in order from the object side, of a first lens group having a negative focal length and a second lens group having a positive focal length, said first and second lens groups being mechanically moved to thereby vary the focal length while maintaining constant the distance between the object surface and the image surface, a finite distance zoom lens system comprising an improvement wherein said first lens group mainly serves to maintain constant the distance between the object surface and the image surface and said second lens group mainly serves to vary the magnification, said first lens group consisting, in order from the object side, of a first positive lens component, a first negative lens component and a second positive lens component, said first positive lens component including a positive lens having a surface on the image side which is convex to the image side, said first negative lens component including two negative lenses, said second positive lens component including a positive meniscus lens having a convex surface on the object side, said second lens group consisting of a third positive lens component, a second negative lens component and a fourth positive lens component, said third positive component including two positive lenses, each convex surface of which is directed to the object, said second negative lens component including a negative lens having on the image side a surface concave to the image side, said fourth positive lens component on the image side two positive lenses, said finite distance zoom lens system satisfying the following conditions:

$-0.53 < f_{max}/f_I < -0.46$ (1)

$0.82 < \Delta l_{I,II}/f_{max} < 0.95$ (2)

$0.06 < f_{max}/f_2 < 0.26$ (3)

$1.76 < (n_{II1} + n_{II2})/2$ (4)

where,
$f_{max}$ is the overall focal length at the high magnification side;
$f_I$ is the focal length of the first lens group;
$\Delta l_{I,II}$ is the amount of variation between the distance between the first and second lens groups;
$f_2$ is the focal length of the image side surface of the first positive lens of the first lens component of the first lens group $(f_2 = r_2/1 - n_1)$;
$r_2$ is the radius of curvature of the image side surface of the first lens of the first positive lens component of the first lens group;
$n_1$ is the refractive index, at the d-line, of the first positive lens of the first lens component of the first lens group;
$n_{II1}$ is the refractive index, at the d-line, of the first positive lens of the third lens component of the second lens group; and
$n_{II2}$ is the refractive index, at the d-line, of the image side lens of the fourth positive lens component of the second lens group.

* * * * *